(12) United States Patent
Boden et al.

(10) Patent No.: US 6,182,228 B1
(45) Date of Patent: Jan. 30, 2001

(54) SYSTEM AND METHOD FOR VERY FAST IP PACKET FILTERING

(75) Inventors: Edward B. Boden, Vestal; Wesley A. Brzozowski, Endicott; Paul A. Gebler, Jr., Vestal, all of NY (US)

(73) Assignee: International Business Machines Corporation, Armonk, NY (US)

( * ) Notice: Under 35 U.S.C. 154(b), the term of this patent shall be extended for 0 days.

(21) Appl. No.: 09/135,102

(22) Filed: Aug. 17, 1998

(51) Int. Cl.[7] ............................................ H04L 9/00
(52) U.S. Cl. ..................... 713/201; 713/154; 713/164; 709/227
(58) Field of Search ............................ 713/201, 151, 713/153, 154, 160, 164; 709/227, 228, 229, 237; 707/9, 101, 102

(56) References Cited

U.S. PATENT DOCUMENTS

| | | | |
|---|---|---|---|
| 5,517,622 | 5/1996 | Ivanoff et al. | 395/200.13 |
| 5,517,628 | 5/1996 | Morrison et al. | 395/375 |
| 5,557,798 | 9/1996 | Skeen et al. | 395/650 |
| 5,606,668 | * 2/1997 | Shwed | 395/200.11 |
| 5,634,015 | 5/1997 | Chang et al. | 395/309 |
| 5,701,316 | 12/1997 | Alferness et al. | 371/53 |
| 6,092,110 | * 7/2000 | Maria et al. | 709/225 |

FOREIGN PATENT DOCUMENTS

| | | | |
|---|---|---|---|
| 0854621 | * 7/1998 | (EP) | H04L/29/06 |

* cited by examiner

Primary Examiner—Robert W. Beausoliel, Jr.
Assistant Examiner—Scott T. Baderman
(74) Attorney, Agent, or Firm—Shelley M. Beckstrand

(57) ABSTRACT

Small, optimized sequences of binary 6-tuples representing filter rules achieve very fast IP packet filtering. Filtering IP packets received from a caller at the physical interface to an operating system kernel is accomplished by processing FILTER rule statements entered by a user in a rules file to generate 6-tuple filtering rules, each of the 6-tuple filtering rules including an operator index; resolving relative and symbolic indexes in these 6-tuples filtering rules to form resolved filtering rules and loading the resolved filtering rules to the operating system kernal; and interpreting the resolved filtering rules for each IP packet received at the physical interface.

10 Claims, 3 Drawing Sheets

SYSTEM AND METHOD FOR VERY FAST IP PACKET FILTERING

CROSS REFERENCE TO RELATED APPLICATIONS

U.S. patent application Ser. No. 09/135,148, filed Aug. 17, 1998, entitled "SYSTEM AND METHOD FOR IP NETWORK ADDRESS TRANSLATION AND IP FILTERING WITH DYNAMIC ADDRESS RESOLUTION", assignee docket number EN998067, filed concurrently herewith is assigned to the same assignee hereof and contains subject matter related, in certain respect, to the subject matter of the present application. The above-identified patent application is incorporated herein by reference.

BACKGROUND OF THE INVENTION

1. Technical Field of the Invention

This invention pertains to IP packet filtering. More specifically, it relates to a use of small, optimized sequences of binary 6-tuples representing filter rules to achieve very fast IP packet filtering.

2. Background Art

Internet protocol (IP) network address translation (NAT) and IP filtering are functions which provide firewall-type capability to an Internet gateway system. In one specific system, this is accomplished by providing means for the system administrator to specify specific NAT and filtering rules via an operational navigator graphical user interface (GUI).

IP packet filtering is the process of checking each Internet protocol (IP) packet that is going to be sent from or has just arrived at a gateway system, or node, in a communications network, and based upon that check of making a decision. The decision is (typically, and insofar as it relates to the preferred embodiment of this invention) whether the packet should be discarded or allowed to continue. These are termed the 'deny' and 'permit' actions. IP filtering is widely used in Internet firewall systems, by independent service providers (ISPs) and organizations connected to the Internet.

Filter rules are most commonly an ordered list of rules, processed sequentially from top to bottom (order is specified by the system administrator). Each rule permits a certain kind of IP traffic. Processing for an IP packet continues until the packet is permitted, explicitly denied, or there are no more rules, in which case it is denied. Usually a number of filter rules must be written for each protocol to be permitted.

It is important the IP filtering actions be particularly efficient and very fast because of the huge volume of IP packets a typical gateway system will handle each day, and because of the fairly large number of filter rules that might have to be processed for each IP packet. Typically, each IP packet that flows through the system must be processed by all the filter rules. A moderately busy system can easily be expected to process 10**6 packets per day. Hence, any unnecessary overhead might cause throughput problems.

It is an object of the invention to provide an improved IP packet filtering system and method.

It is a further object of the invention to provide a very fast IP packet filtering system and method.

SUMMARY OF THE INVENTION

In accordance with the invention, a system and method for filtering IP packets received from a caller at the physical interface to an operating system kernel is provided. Filtering is accomplished by processing FILTER rule statements entered by a user in a rules file to generate 6-tuple filtering rules, each of the 6-tuple filtering rules including an operator index; resolving relative and symbolic indexes in these 6-tuples filtering rules to form resolved filtering rules and loading the resolved filtering rules to the operating system kernel; and interpreting the resolved filtering rules for each IP packet received at the physical interface.

Other features and advantages of this invention will become apparent from the following detailed description of the presently preferred embodiment of the invention, taken in conjunction with the accompanying drawings.

BEST MODE FOR CARRYING OUT THE INVENTION

The problem solved by this invention is: how to generate filtering code that executes in the operating system (OS) kernel from customer-entered rules, that will function correctly and perform very well.

Figure 1:
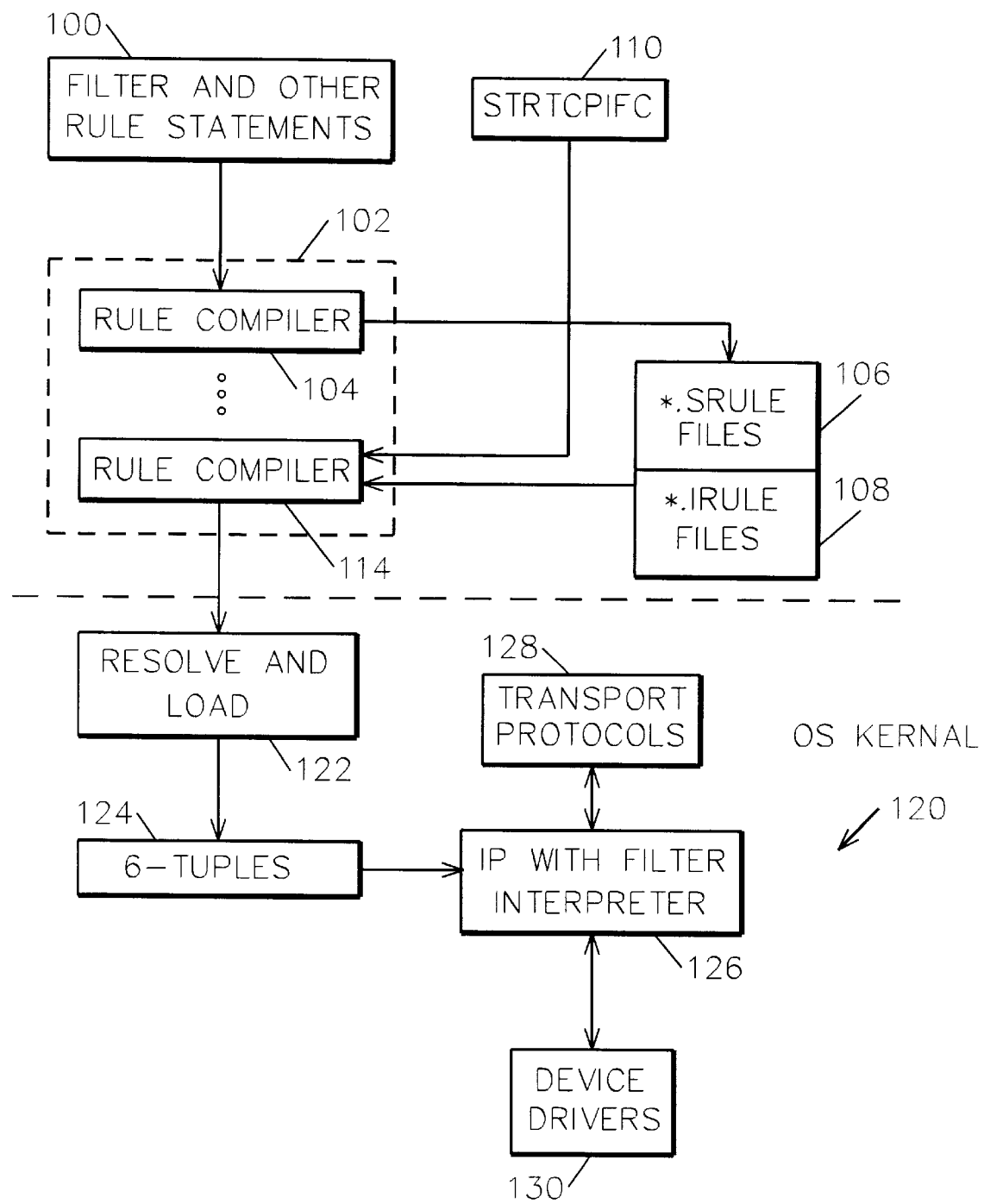
FIG. 1 illustrates the data flow of a preferred embodiment of the invention.

Referring to FIG. 1, the key elements of the invention and the logical relationships and data flow among them, are illustrated.

This invention is concerned with the translation of FILTER statements 100 to a 6-tuple representation 124, and the interpretation 126 of the 6-tuples 124 as IP datagrams flow through the OS kernel 120. FILTER (and other rule) statements 100 are processed by rule compiler 102. An output of a first invocation 104 of the rule compiler 102 is two sets of files, s-rule files 106 and i-rule files 108. These files 106, 108 contain the binary form of the rules in image format (in i-rule files 108) or retain some symbolic information (in s-rule files 106). An 'i' or 's' rule file 106, 108 is generated for each physical interface for which there are rules. Later, when the interface is started in response to start TCP interface (STRTCPIFC) command processing 110, a second invocation 114 of rule compiler 102 completes resolution of s-rule files 106. As is represented by step 122, the resolved rules are loaded to OS kernel 120 in the form of 6-tuples. A key part of loading in the kernel is to resolve the various relative and symbolic addresses in 6-tuples to absolute addresses. Thereupon, 6-tuples 124 are ready to be used by filter interpreter 126 as IP datagrams enter and leave the system via device drivers 130 to input/output processor (IOP), not shown. In a specific embodiment, IOPs provide the actual physical interface to a system, and a network cable of some type plugs into an IOP. Each IOP is represented within the OS kernel by a physical interface control block. Filter interpreter 126 communicates with such IOPs through device driver code 130 residing within kernel 120. Transport protocols 128 (such as TCP, UDP) are accessed by filter interpreter 126 is processing 6-tuples 124.

Both image rules (irules) 108 and symbolic rules (srules) 106 are in 6-tuple form, which is the output of rule compiler invocation 104, which is further described hereafter in connection with Table 2. Both irules 108 and srules 106 go through an address resolution during load 122, of the first two elements of their tuples. However, the srules 106 have an additional resolution that occurs during the compiler call 114 in connection with 122 load, but outside of kernel 120. That additional resolution is required to change certain of their value1 206 or value2 208 elements from symbolic to actual values (IP addresses.)

Figures 2, 3:
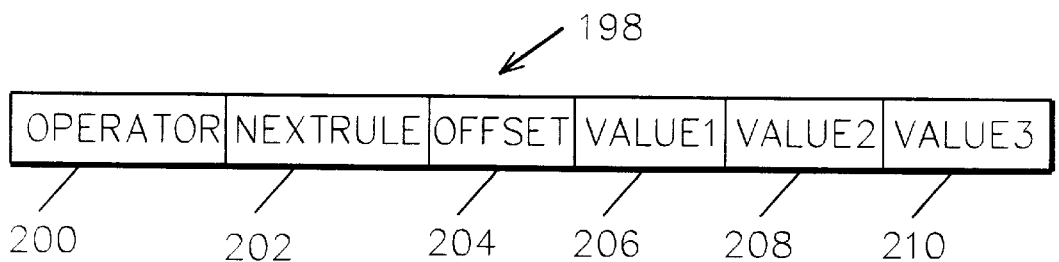
FIG. 2 illustrates an example set of IP filter rules.
FIG. 3 illustrates the format of a 6-tuple in accordance with the preferred embodiment of the invention.

FIG. 2 shows the FILTER rule statements 100 as entered by the system administrator and seen by rule compiler 102. Three example rules 140, 142 and 144 are shown. The first two, rules 140 and 142, are explicitly entered by the system administrator, and the last, rule 144, called the 'default deny' rule, is generated automatically by rule compiler 102.

Rule 1 140 for filter set f1 includes ACTION=PERMIT 150, and selectors DIRECTION=* 152(read * as "splat", where * means "any"), source address SRCADDR=* 154, destination address DESTADDR=* 156, and protocol PROTO=TCP 158.

Rule 2 142 for filter set f1 includes ACTION=PERMIT 160, and selectors DIRECTION=* 162, SRCADDR=* 164, DESTADDR=* 166, PROTO=UDP 168, source port SRCPORT={161,162} 170, destination port DESTPORT= {161,162} 172, and journal JRN=ON 174.

Rule n 144 for filter set f1 includes ACTION=DENY 180, and selectors DIRECTION=* 182, SRCADDR=* 184, DESTADDR=* 186, and PROTO=* 188.

Rules 140, 142 and 144 are logically processed top-to-bottom for each IP packet 128; so for each packet 128, if the IP packet matches the rules tests (all selectors for a rules filter set 140, 142 or 144), then the ACTION 150, 160 or 180 specified by the rule is taken (for rule 1 140, the PERMIT action 150 means 'allow the IP packet to continue'). If a given IP packet 128 does not match the first rule 140, it is checked against the next rule 142, and so on, until the last rule 144. The default deny rule 144 always matches any IP packet and has ACTION 180 of deny, which means the IP packet 128 is discarded (not allowed to continue).

So, the general approach in ordering FILTER rules 146, is to write rules which allowed desired IP traffic to continue. Any IP packets not matched by some explicit PERMIT rule 140, 142, will be discarded by the default deny rule 144.

In FIG. 2, first filter rule 140 will allow all TCP IP datagrams, from any source, to any destination; and second filter rule 142 will allow UDP traffic if the source port or destination port is 161 or 162. These are well-known ports for SNMP (Simple Network Management Protocol), so this rule allows SNMP traffic (as an example). The SET name ('f1') is used to associate FILTER rule sets with specific physical interfaces via a FILTER_INTERFACE statement (not shown). With this statement, a specific physical interface (named as part of system configuration) is given one or more filter sets. Since only the sets named are loaded for a physical interface, there is an inherent performance advantage over the typical implementation where there is only a single set of rules for the entire system. This means a separate copy of the filter rules is made for each interface, but the physical size of these rules is tiny, relative to system memory and performance gains of having focused rules.

Referring to FIG. 3, the logical structure of each 6-tuple includes operator 200, nextrule 202, offset 204, value1 206, value2 208 and value3 210:

(operator, nextrule, offset, value1, value2, value3)

Operator 200 represents a logical operation to be performed (e.g. tests such as '=', '<=', etc.). As generated by compiler 102 during invocation 104, this is a function index, that is resolved to a function pointer during invocation 114 for loading to memory as 6-tuples 124 in OS kernel 120. (6-tuples 124 in FIG. 1 include some arbitrary number of 6-tuples 198, FIG. 3.) Operators 200 are specific to a given byte length. That is, a 1-byte equality and 2-byte equality are different operators.

Nextrule 202 is a pointer to the first 6-tuple of the next rule in sequence, which is another instance of 6-tuple 198. As generated by rule compiler 102 during invocation 114, this is an offset that is resolved to a physical memory location when loaded to memory.

Offset 204 is a number that is the byte offset into an IP packet to a field in that IP packet that will be checked by this 6-tuple.

Value1 206 is the value to be compared against the field in the IP packet accessed by offset 204. With this tuple element, the logical operation of the 6-tuple can now be expressed as "operand1, operator, operand2". Operand1 is obtained from the tuple element 'offset', operator is tuple element 'operator' and operand2 is tuple element 'value1'. Hence, the tuple represents expressions such as these; 'source IP address, equals?, test address'. The nextrule tuple-element is resolved to point to another 6-tuple.

Value2 208 is used in some tuples to represent additional or special actions for the tuple. In this preferred embodiment, as an example of such actions, a special additional action implemented via value2 is journaling. If set to 1 in the rule's permit or deny tuple, then a journal entry is created outside kernel 120 that provides direct system administrator visibility to the filter action. This is used for debugging and verifying filter rules and for detecting penetration attacks. The key information contained in each journal entry is: action taken (permit or deny), direction of IP datagram (inbound or outbound), source and destination IP addresses, source and destination port numbers, and the filter rule number. This filter rule number is how the customer knows exactly which FILTER statement the journal entry applies to—the compiler 102 generates these numbers (not shown) and the GUI provides the system administrator access to this listing of all the rules with their numbers. The rule number is in value3 210 of the tuple. Alternatively, value3 210 may contain an IP subnet mask, applicable for some tuples. A common way of representing TCP/IP subnets is by an IP address with a subnet mask. The mask is 'anded' (logically, bitwise) with the IP address. All IP addresses that are equal to the anded address after anding with the same mask are within the subnet. An example: 9.130.69.3, 255.255.255.* (sometimes written as 9.130.69.*) refers to this range of IP addresses: 9.130.69.1 through 9.130.69.255.

Figure 4:
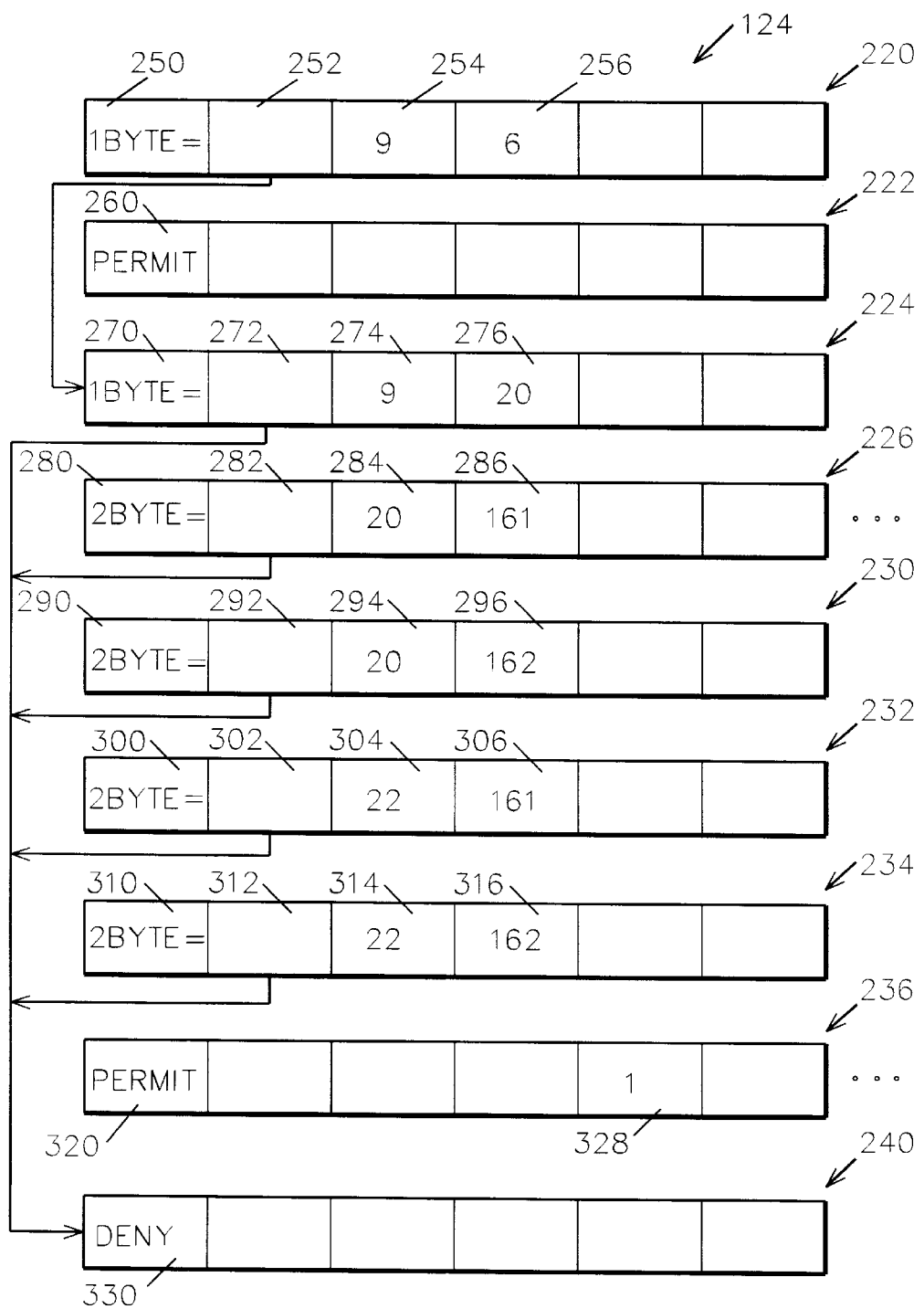
FIG. 4 illustrates the logical structure of 6-tuples, for the example set of FIG. 2, following the load and resolution step of FIG. 1 in accordance with the preferred embodiment of the invention.

Referring to FIG. 4, the set of 6-tuples 220, 222, 224, 226, 230, 232, 234, 236 and 240 that correspond to the three filter rules 140, 142, 144 (FIG. 2), is shown. Table 1 presents a second, or alternative, representation of these 6-tuples.

TABLE 1

| 6-Tuples |
|---|
| (1byte=,ptr1,9,6,,) (permit,,,,,) (1byte=,ptr2,9,20,,) |
| (2byte=,ptr3,20,161,,) . . . |
| (2byte=,ptr4,20,162,,) (2byte=,ptr5,22,161,,) (2byte=,ptr6,22, |
| 162,,) (permit,,,,1,) . . . |
| (deny,,,,,,) |

All 6-tuples have six elements, some of which might be null (binary 0) or some other unused value.

In table 1, ptr1 corresponds to pointer 252 in FIG. 4, ptr2 corresponds to pointer 272, ptr3 to pointer 282, ptr4 to pointer 292, ptr5 to pointer 302, and ptr6 to pointer 312.

Of course, a direct in-memory form of 6-tuples does not contain ")" or ",", is not on separate lines, and is simply 28*n contiguous bytes of binary, where n is the number of 6-tuples and 28 is the size, in this specific example, in 8-bit bytes (aka octets) of a 6-tuple. There is no effective limit on the number of FILTER rules 140, 142, 144 customers may define, nor on the resulting size of 6-tuples (the total length in bytes of 6-tuples 124).

The diagram of Table 1 and FIG. 4 does not show the resolution of operators. Each of the operators shown (1 byte=250, 270, 2 bytes=280, 290, 300, 310, permit 260, deny 330) is actually a function pointer to a C++ entry point. The operator functions take as their single argument, a pointer to the 6-tuple that contains their function pointer and returns 1 (or, true—that is, the logical test specified by the 6-tuple is true), 0 (or, false—the logical test failed), 2 for permit and 3 for deny. Thus, the function argument is a pointer to the 6-tuple. Referring to the example of FIG. 4, the argument to 1 byte=(field 250) is 220 (or a pointer to 6-tuple 220.) The function argument for permit (field 260) is 222 (that is, a pointer to 6-tuple 222), and so forth. This neat scheme simplifies the definition and use of these functions 250, 260, . . . by filter interpreter 126, and keeps the interpreter small.

The point of resolving function 200 and nextrule 202 indexes upon 6-tuple load 122, is to improve performance. The resolution is done once, on load 122, and then does not need to be done for each IP packet 128 as it is processed.

In FIG. 4, the elipses following 6-tuples 226, and 236, denote that additional, arbitrary numbers of 6-tuples follow, and these elipses correspond to elipses in FIG. 2. Thus, 6-tuple representations are provided in FIG. 4 for all rules shown in FIG. 2. The correspondence between FILTER statements 140, 142, and 144 and the 6-tuples in FIG. 4 is as follows: 140→220, 222; 142→224, 226, 230, 234, 234, 236; and 144→240.

The values 9, 20, 22 in the offset tuple elements 254, 284 and 304, respectively, are the byte offset into an IP datagram at which the appropriate field is found. 9 corresponds to (is the offset to) the protocol field in an IP datagram. Similarly, 20 corresponds to source port and 22 corresponds to destination port. The values in tuple element value1 (fields 256, 276, 286, 296, 306 and 316) are 6 (TCP), 20 (UDP), and so forth.

Each FILTER statement 100 (examples including 140, 142, and 144) belongs to a named set. In this example, the only set shown is the set named 'f1'. All rule statements 100 are partitioned by physical interface (IOP). The customer (system administrator) uses a FILTER_INTERFACE statement to bind a set of rules to a particular physical interface. (See FIG. 7 in U.S. patent application Ser. No. 09/135,148, filed Aug. 17, 1998, assignee docket number EN998067.) This gives an inherent performance advantage over having a single set of filter rules for the entire system, since only the required rules need be defined for each physical interface. In processing each datagram, filter interpreter 126 is given the filter rules that apply to a given physical interface. For outbound datagrams, the routing function has already determined what physical interface will be used. For inbound datagrams, the rules used are those associated with the physical interface that the datagram arrived on.

The key portions of the invention are:
First, processing the FILTER rule statements 146 to generate the 6-tuple form 198 of the filtering rule 100, 140 . . . .
Second, loading and resolving relative & symbolic indexes 202, 204 in 6-tuples.
Third, interpreting the 6-tuples 124 for each IP datagram 128.
Fourth, operating filter rule interpreter 126 to call certain operator functions.

Tables 2–5 are pseudo-code (C++—like syntax) descriptions of these functional steps.

TABLE 2

Processing FILTER Statements

```
// Processing FILTER statements to generate 6-tuples
    create tuple buffer to hold constructed 6-tuples;
    set 'nextbyte' to beginning of tuple buffer;
    while (more rule statements exist in file) {
        if (rule statement is a FILTER statement) {
            for (each logical condition in statement) {
                construct 6-tuple for condition;
                copy to 'nextbyte' of tuple buffer;
                increment tuple buffer 'nextbyte';
            }
            construct final 'action' 6-tuple;
            copy to 'nextbyte' of tuple buffer;
            increment tuple buffer 'nextbyte';
            for (each 6-tuple generated for this FILTER rule) {
                set 'nextrule' tuple element =
                    tuple buffer nextbyte';
            }
        }
        else { /* process statement as usual*/ }
    }
    write s-rule or i-rule file for each physical interface;
```

TABLE 3

Loading and Resolving 6-tuple Indexes

```
// Load & resolve 6-tuple indexes
    if (loading s-rule file) { // function in OS, above
                                // kernel
        for (each Symbolic address) {
            get offset from index table;
            change offset to actual IP address;
        }
    }
    load rules to kernel;
    for ( every 6-tuple ) { // function in OS, in kernel
        replace operator index with pointer to function;
        compute pointer to next rule based on nextrule value;
        replace nextrule value with computed pointer;
    }
```

TABLE 4

Interpreting 6-tuples

```
// Interpreting 6-tuples
// code is invoked for each IP datagram
    obtain tuple pointer to 1st 6-tuple;
    while (1) {
        result = call operator function ( 6-tuple, datagram );
        if ( result is false ) set tuple pointer to nextrule;
        else if ( result is true ) set tuple pointer to next
            tuple;
        else break; // leave while loop
    }
    if ( tuple value2 is 1 ) generate journal entry for IP
        packet;
    return result; // caller does actual permit or deny
                    // action
```

TABLE 5

Representative Operator Functions

```
bool 1byte=(6tuple,packet) {return byte at
    packet.6tuple.offset == byte 6tuple.value1;}
bool permit(6tuple,packet) {return true;}
bool 2byte=( 6tuple,packet) {return 2bytes at
    packet.6tuple.offsett== 2bytes at 6tuple.value1;}
bool deny( 6tuple,packet) {return false; }
```

ADVANTAGES OVER PRIOR ART

It is an advantage of the preferred embodiment of this invention that an improved, very fast IP packet filtering method and system is provided.

ALTERNATIVE EMBODIMENTS

It will be appreciated that, although specific embodiments of the invention have been described herein for purposes of illustration, various modifications may be made without departing from the spirit and scope of the invention. In particular, it is within the scope of the invention to provide a memory device, such as a transmission medium, magnetic or optical tape or disc, or the like, for storing signals for controlling the operation of a computer according to the method of the invention and/or to structure its components in accordance with the system of the invention.

Accordingly, the scope of protection of this invention is limited only by the following claims and their equivalents.

We claim:

1. A method for generating, from user-entered rules, filtering rules for execution in an operating system kernel to filter an IP packet received at a physical interface to said operating system kernel comprising the steps of:

compiling said user-entered filtering rules into sets of binary symbolic and image files, with one said set for each said physical interface for which there exist said user-entered rules;

upon starting said physical interface to said operating system kernel,
    resolving filtering rules in said symbolic file to form resolved 6-tuple filtering rules in image format, and loading to said operating system kernel said resolved 6-tuple filtering rules and 6-tuple filtering rules from said image file;

said 6-tuple filtering rules in image format including an operator field and, selectively, a next rule field, an offset field and zero or more parameter value fields;

said operator field comprising a function index that is resolved to a function pointer upon being loaded to memory in said operating system kernel;

said next rule field selectively comprising a pointer to a first 6-tuple of a next rule;

said offset field selectively representing an offset into an IP packet to be checked by said first 6-tuple; and a first said parameter value field comprising a value to be compared against a field in said IP packet accessed by said offset field.

2. The method of claim 1 wherein function and next rule indexes are resolved upon a 6-tuple load to said operating system kernel, whereby resolution is done once and need not be done for each IP packet as it is processed.

3. Method for filtering IP packets received from a caller at a physical interface to an operating system kernel, comprising the steps of:

processing FILTER rule statements entered by a user in a rules file to generate 6-tuple filtering rules, each of said 6-tuple filtering rule including an operator index;

resolving relative and symbolic indexes in said 6-tuple filtering rules to form resolved filtering rules and loading said resolved filtering rules to said operating system kernel; and interpreting said resolved filtering rules for each IP packet received at said physical interface.

4. The method of claim 3, said processing step comprising the further steps of:

creating a tuple buffer to hold constructed 6-tuple filtering rules;

setting a next byte pointer to the beginning of said tuple buffer;

while more filter rule statements exist in said rules file, if a next rule is a filter statement, for each next logical condition in said filter statement,
    constructing a 6-tuple for said next logical condition, copying said 6-tuple to said tuple buffer at the location set by said next byte pointer, and incrementing said next byte pointer;

constructing a final action 6-tuple and copying said final action 6-tuple to said tuple buffer at the location set by said next byte pointer, and incrementing said next byte pointer; and for each 6-tuple generated for this filter rule, setting a next rule tuple element to point to the next 6-tuple in said tuple buffer.

5. The method of claim 4, said resolving and loading steps further comprising the steps of:

for each 6-tuple generated for this filter rule,
    replacing said operator index with a pointer to a corresponding function;
    computing a next rule pointer to the next rule based on said next rule tuple element; and
    replacing said next rule tuple element with said next rule pointer.

6. The method of claim 5, said interpreting step comprising the further steps of:

obtaining a tuple pointer to a first 6-tuple;

while an operator function returns a value of true,
    calling the operator function of the tuple designated by said tuple pointer, and passing, as the parameters to said operator function, the 6-tuple pointed to by said tuple pointer;
    responsive to said operator function returning a value of false, setting said tuple pointer to point to the next rule and leaving this while loop;
    responsive to said operator function returning a value of true, setting said tuple pointer to the next 6-tuple and continuing this while loop.

7. The method of claim 6, wherein the while loop of said interpreting step comprising the further steps of:

responsive to the 6-tuple pointed to by said tuple pointer including a journal entry parameter which evaluates as true, generating a journal entry for said IP packet; and returning a result value to said caller selectively for permitting or denying the action requested in said IP packet.

8. A system for filtering IP packets received from a caller at a physical interface to an operating system kernel, comprising:

a first compiler function for processing FILTER rule statements entered by a user in a rules file to generate 6-tuple filtering rules, each said 6-tuple filtering rule including an operator index;

a second compiler function for resolving relative and symbolic indexes in said 6-tuples filtering rules to form resolved filtering rules and loading said resolved filtering rules to said operating system kernel; and said operating system kernel being operative for interpreting said resolved filtering rules for each IP packet received at said physical interface.

9. A program storage device readable by a machine, tangibly embodying a program of instructions executable by a machine to perform method steps for filtering IP packets received from a caller at a physical interface to an operating system kernel, said method steps comprising:

processing FILTER rule statements entered by a user in a rules file to generate 6-tuple filtering rules, each said 6-tuple filtering rule including an operator index;

resolving relative and symbolic indexes in said 6-tuples filtering rules to form resolved filtering rules and loading said resolved filtering rules to said operating system kernel; and interpreting said resolved filtering rules for each IP packet received at said physical interface.

10. An article of manufacture comprising:

a computer useable medium having computer readable program code means embodied therein for filtering IP packets received from a caller at a physical interface to an operating system kernel, the computer readable program means in said article of manufacture comprising:

computer readable program code means for causing a computer to effect processing FILTER rule statements entered by a user in a rules file to generate 6-tuple filtering rules, each said 6-tuple filtering rule including an operator index;

computer readable program code means for causing a computer to effect resolving relative and symbolic indexes in said 6-tuple filtering rules to form resolved filtering rules and loading said resolved filtering rules to said operating system kernel; and computer readable program code means for causing a computer to effect interpreting said resolved filtering rules for each IP packet received at said physical interface.

* * * * *